US006659045B2

(12) United States Patent
Thompson

(10) Patent No.: US 6,659,045 B2
(45) Date of Patent: Dec. 9, 2003

(54) MULTI PURPOSE HOUSE FOR PETS

(76) Inventor: Vincent S. Thompson, 220 Main Street, Cawston, British Columbia (CA), V0X 1C0

( * ) Notice: Subject to any disclaimer, the term of this patent is extended or adjusted under 35 U.S.C. 154(b) by 0 days.

(21) Appl. No.: 10/271,584

(22) Filed: Oct. 17, 2002

(65) Prior Publication Data

US 2003/0075115 A1 Apr. 24, 2003

(51) Int. Cl.[7] .............................................. A01K 29/00
(52) U.S. Cl. ..................................................... 119/482
(58) Field of Search ......................... 119/161, 165–170, 119/482

(56) References Cited

U.S. PATENT DOCUMENTS

| 3,885,523 | A | * | 5/1975 | Coleman | 119/165 |
| 4,807,808 | A | * | 2/1989 | Reed | 229/103 |
| 5,092,277 | A | * | 3/1992 | Baillie et al. | 119/165 |
| 5,361,725 | A | * | 11/1994 | Baillie et al. | 119/165 |
| 5,713,302 | A | * | 2/1998 | Walter | 119/165 |
| 5,738,040 | A | * | 4/1998 | Simmons | 119/165 |
| 5,769,026 | A | * | 6/1998 | Kohn | 119/165 |
| 5,806,461 | A | * | 9/1998 | Kiera | 119/165 |
| 5,924,383 | A | * | 7/1999 | Smith | 119/165 |
| 6,237,534 | B1 | * | 5/2001 | Schwartz | 119/165 |
| 6,371,048 | B1 | * | 4/2002 | Smith | 119/166 |
| 6,415,738 | B1 | * | 7/2002 | Hotter | 119/165 |

FOREIGN PATENT DOCUMENTS

CA        2006054       3/1992

* cited by examiner

Primary Examiner—Thomas Price
(74) Attorney, Agent, or Firm—Ridout & Maybee

(57) ABSTRACT

A structure suitable for use by an animal having paws, said container comprising a housing including a base, substantially contiguous outer walls, and a top and defining an interior and an exit located above the base; a divider separating the interior into a litter region and an exit region, the exit region being located above and substantially beside the litter region and immediately below the exit; a foot cleaner surface within the exit region extending substantially from said litter region to the exit, the foot cleaner surface including a ramp portion, adapted to encourage the animal to extend and flex its paws when ascending the ramp; such that in operation, litter may be placed in the litter region for use by the animal, and the animal must walk along the foot cleaner surface ramp portion to exit the container, causing litter to fall from the paws, thereby reducing the amount of litter remaining on the animal's paws upon exiting the container.

13 Claims, 3 Drawing Sheets

MULTI PURPOSE HOUSE FOR PETS

FIELD OF THE INVENTION

The invention relates to a multi purpose house for pets, especially cats, and more particularly a structure which is particularly well suited as a pet litter container.

BACKGROUND OF THE INVENTION

A variety of pet litter containers are known in the art. However, known pet litter containers fail to provide a satisfactory means of controlling the odor and mess associated with pet litter, such as cat litter, which can be tracked out of the container by the animal upon its exit. Additionally, pet litter containers tend to be large and bulky, and are unsuitable for use with those who have to travel frequently with their pet, or who have to transport the litter container over considerable distances, at a high shipping cost. They are also usually messy and hard to clean.

U.S. Pat. No. 5,361,725 of Baillie teaches a litter containment apparatus for kittens and cats having two laterally adjacent portions. The first portion contains a litter box, and the second contains a mesh-like region over which the animal must pass upon exiting the container. Although some litter may fall from the cat's paws while moving over the mesh-like portion, this apparatus fails to provide a means for inducing the cat to flex its paws, thereby encouraging litter caught between the toes to fall away within the apparatus, and not be tracked out.

A similar system is taught in U.S. Pat. No. 3,885,523 of Coleman.

U.S. Pat. No. 5,092,277 of Baillie teaches a variation on the typical side by side orientation of the mesh portion with the litter portion, by elevating the mesh portion to form a horizontal walking surface raised above the litter portion. This orientation may not require the animal to flex its paws upon exit, permitting litter to remain caught between the toes. Additionally, by placing grid or mesh portions above the litter area, the exit of odors from the litter region is facilitated, and may render such an apparatus unsuitable for use in close proximity to human living quarters.

U.S. Pat. No. 5,924,383 of Smith teaches a cat litter box threshold comprising an enclosed ramp suitable for abutment against a side entry of a conventional covered litter box. The exit ramp taught by Smith is not enclosed within the litter container itself. Thus, litter leaving the animals paws would scatter below the ramp, and would need to be picked up and lifted into the litter box. Moreover, the abutment of the ramp against the side entry of a covered litter box might prevent the use of a free-swinging door to the litter box. Thus, the apparatus of Smith may be unsuitable for use with litter boxes having doors, with the consequence that odor could pass directly from the litter portion out the door and into the room or home in which the box is located.

Canadian Patent Application 2,006,054 of Wolak teaches a collapsible litter box, having a generally rigid support skeleton enclosed in a flexible, bag-like member. This apparatus does not appear to provide for the removal of lifter from the animals paws prior to its exit from the container. Thus, animals using apparatus of this type may track litter away from the litter box.

SUMMARY OF THE INVENTION

It is an object of the present invention to provide a pet litter container which avoids many of the problems of these prior art containers.

In accordance with the present invention there is provided a structure suitable for use by an animal having paws. The structure comprises a housing including a base, substantially contiguous outer walls, and a top, these features defining an interior and an exit located above the base. A divider separates the interior into a litter region and an exit region. The exit region is located above and substantially beside the litter region and immediately below the exit, A foot cleaner surface is provided within the exit region and extends substantially from the litter region to the exit. The foot cleaner surface includes a ramp portion, adapted to encourage the animal to extend and flex its paws when ascending the ramp. In operation, litter may be placed in the litter region for use by the animal, and the animal must walk along the foot cleaner surface ramp portion to exit the container, causing litter to fall from the paws, thereby reducing the amount of litter remaining on the animal's paws upon exiting the container.

The structure according to the present invention is effective in removing litter from an animal's paws after use of the container, while at the same time containing odors within the litter box housing. It is also easy to clean. It is lightweight while, at the same time, can support an animal at all levels, enabling it to act as a facility for the animal's toiletry, feeding and lounging.

BRIEF DESCRIPTION OF THE DRAWINGS

These and other advantages of the invention will become apparent upon reading the following detailed description and upon referring to the drawings in which.

Figure 1:
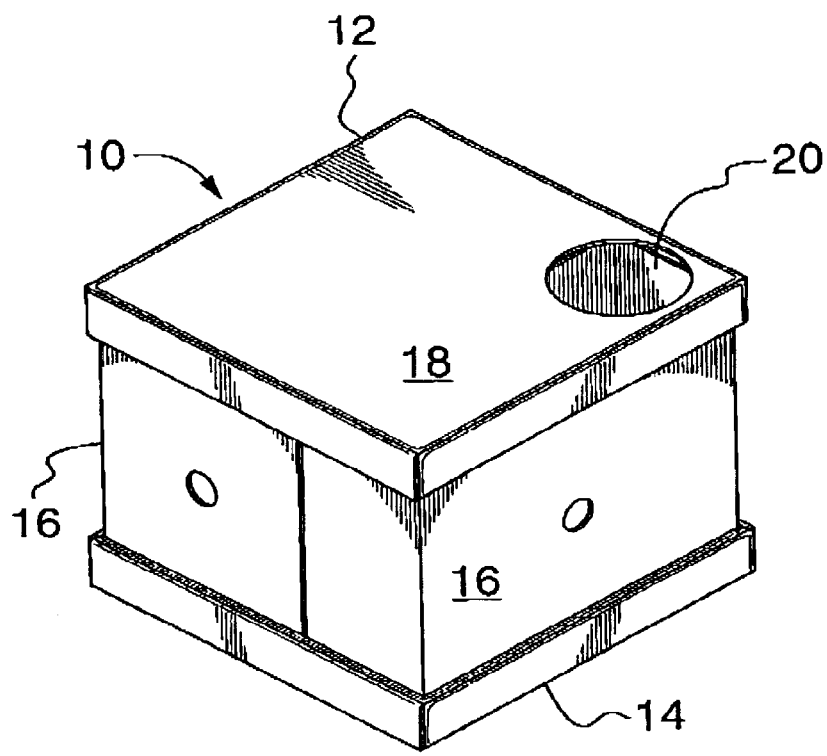
FIG. 1 is a perspective view of an embodiment of the structure of the present invention in its open position.
Figure 2:
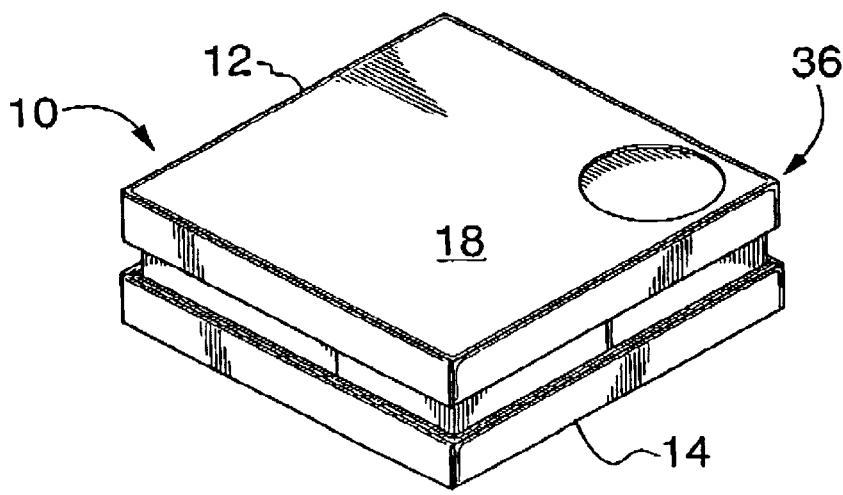
FIG. 2 is a perspective view of the structure of FIG. 1 shown in its collapsed position.
Figure 3:
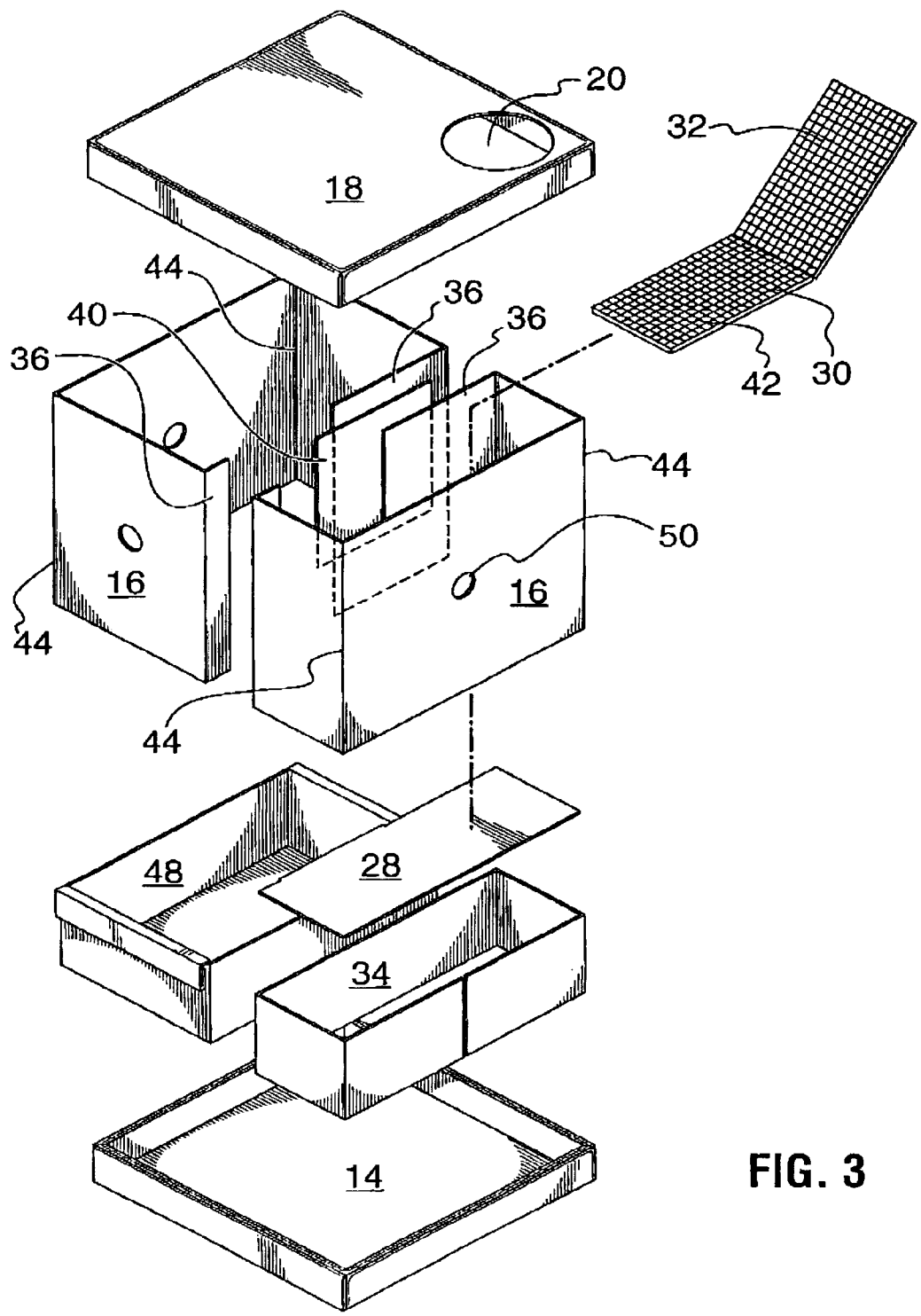
FIG. 3 is an exploded view of the structure of FIG. 1.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

In a preferred embodiment there is provided a structure or container 10 suitable for use by an animal having paws. The container preferably comprises a housing 12 including a base 14 substantially contiguous outer walls 16 and a top 18. The top preferably contains an exit 20. The housing 12 defines an interior 22. The interior 22 is divided into a litter region 24 and an exit region 26. The exit region 26 is located above and substantially beside the litter region 24. Preferably the exit region 26 includes an elevated floor 28 adapted to collect litter released from the animal's paws, and facilitate the sweeping of this litter back into the litter region 24 situated below it.

A foot cleaner surface 30 extends substantially from the litter region 24 to the exit 20 resting on floor 28. The foot cleaner surface 30 preferably includes a ramp portion 32 adapted to encourage the animal to extend and flex its paws when ascending the ramp. Floor 28 is itself supported on elevating base 34.

In operation litter may be placed in the litter region 24 for use by the animal. The animal will walk along the foot cleaner surface 30 and the ramp portion 32 to exit the container, causing litter to fall from the paws onto the floor 28. Litter on the floor 28 may be conveniently swept directly across and down into the litter container.

The litter region and the exit region are preferably separated by a divider in the form of an interior wall 36 extending substantially from the top 18 (when in position on walls 16) to the base 14 and defining a doorway 38 between the litter region 24 and the exit region 26, such that the animal must pass through the doorway 38 in order to exit. The use of doorway 38 may reduce the movement of odors from the litter region through the exit region and out into the surrounding environment. In addition, the doorway may increase the amount of time the animal has to spend on the foot cleaning surface 30, thereby enhancing the level of litter removal.

The base 14, outer walls 16, top 18, base 34, and interior wall 36 are preferably composed of substantially solid lightweight sheets of material sufficient to reduce odor release through the container. COROPLAST™, or similar lightweight plastic corrugated material has proven ideal. Interior wall 36 and outer walls 16 are intended to be bearing walls for top 18 so that an animal may be supported on that top. Thus, the cat litter container 10 may serve not only as a facility for toiletry, it may also support, on top 18 or elsewhere, facilities for the animal to lounge and to eat. In this manner, the structure becomes a multi-functional house for the cat.

The container 10 preferably includes an adjustable door 40, slidable between divider 34 and wall 36, which door is extendible across the doorway 38 and can be adjusted for animal size to ensure that, while the animal can pass through the doorway 38 the space provided is not significantly larger than is needed.

The foot cleaner surface 30 preferably includes a ramp portion 32 and a substantially horizontal portion 42. The ramp portion 32 must be sufficiently rigid to support the weight of the animal upon exit and entry. The ramp portion is preferably made of a material having gaps at least as large as the average diameter of litter, so as to permit litter to pass through the ramp portion 32 and fall to the floor 28 for recovery. Preferably, the ramp portion 32 has a grate-like or similar construction.

In some instances, a collapsible litter container will be desirable. In such cases, the walls 16 have hinged portions 44 allowing the walls to collapse when separated from the base and top, such that the housing is convertible between an open position in which the walls are secured to and extend upwardly from the base and the top is releasedly secured to an upper portion of the walls (as shown in FIG. 1) and a collapsed position in which the walls bend at the hinged portions 44 such that they may be reoriented to be substantially parallel to the base 14 and the top 18. In a preferred embodiment the walls 16, floor 28, divider 34, and interior wall 36 may be oriented parallel to the base 14 and fitted substantially within the base to form a compact package suitable for shipping 46.

The hinged portions 44 may be produced in any suitable manner, such as a flexible or creased region of the same material used to form the walls, or hinges separating individual walls, and permitting, for example, side walls to be folded onto front walls and back walls.

Preferably the walls 16 defining the litter region 24 are physically separate from the walls 16 defining the exit region 26, when a collapsible embodiment is desired. However, it will be appreciated that a variety of wall arrangements are contemplated and fall within the scope of the invention. Preferably a litter box or waste pan 48 is placed in the litter region 24 prior to the addition of litter. This pan 48 is preferably also formed using COROPLAST™ material, from a sheet having folding walls. This construction avoids any leakage problem. Also, the pan walls can be unfolded for easy cleaning and for compact shipping or storage with the other components of structure 10. This will facilitate cleaning of the container 10. In some instances, it will be desirable to line the litter region 24 or the litter box 48 with a plastic bag or the like, to assist in the collection of used litter. Holes 50 may be provided in the walls 16 to provide light to the interior of the container 10, or to provide a source of fresh air to the interior 22. However, it is desirable to reduce means for the communication of odors from the litter region 24 to the room in which the container 10 is located. Thus, holes 50 should be used only where necessary, and should be no larger than is necessary for the purpose.

Figure 4:
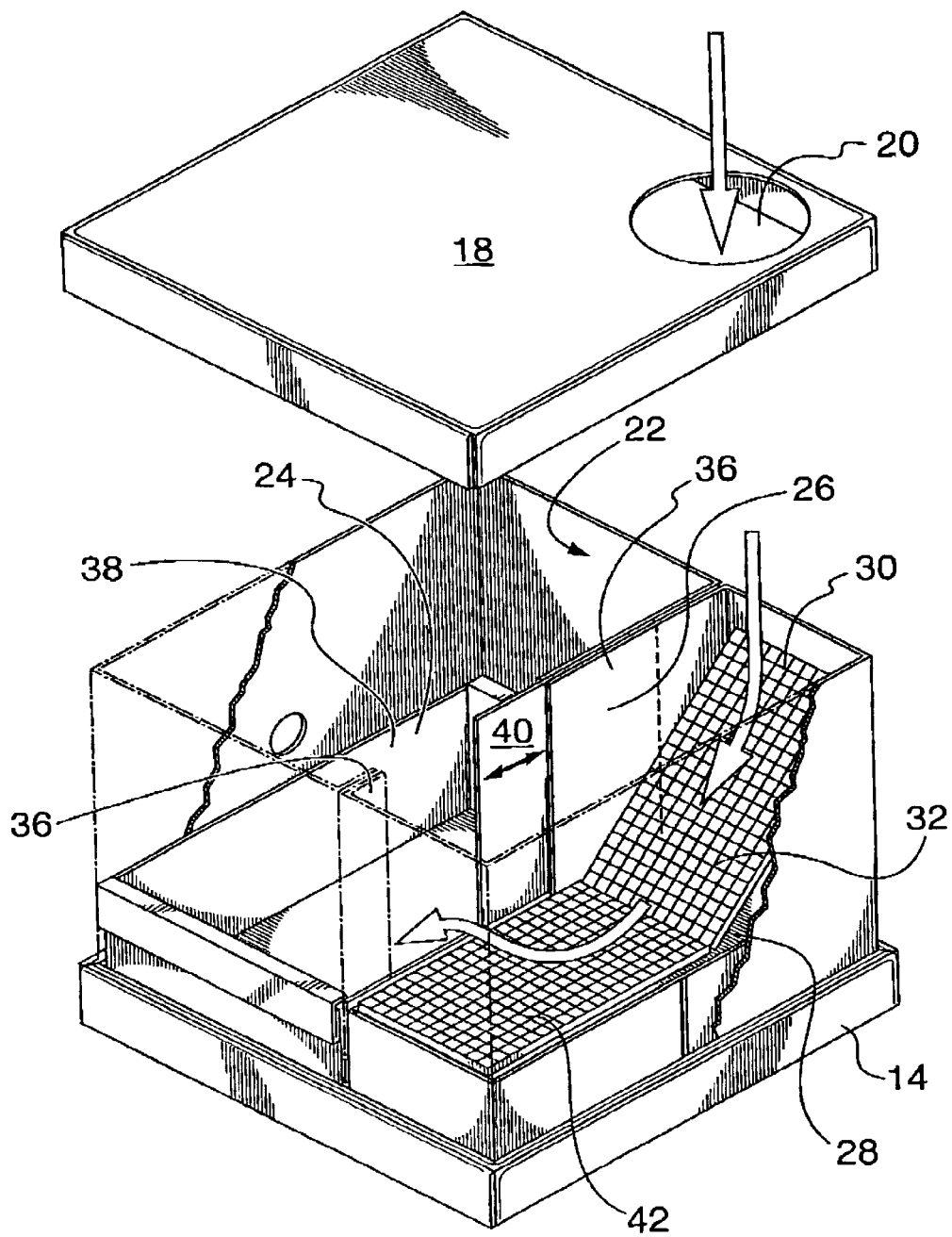
FIG. 4 is a break away perspective view of the structure of FIG. 1, with the lid removed to show interior detail, and showing the anticipated entry direction of an animal, as well as the sliding door movement.

In operation, an animal enters the container 10 through the exit 20 in the direction shown in FIG. 4. The animal walks down the ramp portion 32 and the horizontal portion 42 of the foot cleaner surface 30, passes through the doorway 38 and enters the litter region 24. When exiting, the animal leaves the litter region 24 through the doorway 38, which has preferably been made narrow through use of the adjustable door 40. The animal walks along the horizontal portion 42 and the ramp portion 32 of the foot cleaner surface 30, and extends and flexes its paws when ascending the ramp portion 32, thereby causing litter to fall off the paws and be collected on the floor 28 for easy relocation to the litter region 24.

The top 18 is preferably removable for easy access to the container 10 and particularly to facilitate cleaning of the litter region 24 and the sweeping of litter off of the floor 28 and back into the litter region 24.

Thus, it is apparent that there has been provided in accordance with the invention multi purpose house for pets that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A structure suitable for use by an animal having paws, said container comprising:

a housing including a base, substantially contiguous outer walls, and a top and defining an interior and an exit located above the base;

a divider separating the interior into a litter region and an exit region, said exit region being located above and substantially beside said litter region and immediately below the exit;

a foot cleaner surface within the exit region extending substantially from said litter region to the exit, said foot cleaner surface including a ramp portion, adapted to encourage the animal to extend and flex its paws when ascending the ramp; such that in operation, litter may be placed in the litter region for use by the animal, and the animal must walk along the foot cleaner surface ramp portion to exit the container, causing litter to fall from its paws, thereby reducing the amount of litter remaining on the animal's paws upon exiting the container wherein said housing is convertible between an open position in which said walls are secured to and extend upwardly from said base and said top is releasably secured to an upper portion of said walls; and a collapsed position in which said walls are substantially parallel to said base and top.

2. The structure of claim 1, wherein the base, outer walls, top and divider are composed of substantially solid and rigid lightweight sheets of material such that odor release from the container is reduced.

3. A structure according to claim 2, wherein the divider extends between the base and the top so as to act as a bearing wall permitting the top to support the weight of the animal when on the top.

4. The structure of claim 1, wherein the divider comprises an interior wall extending substantially from said top to said base and defining a doorway between the litter region and the exit region, such that odor release through the exit is reduced and the animal must pass through the doorway to exit the container.

5. The structure of claim 4 further including an adjustable door extensible across the doorway and adjustable for animal size to ensure that the animal contacts as much of the foot cleaner as possible when exiting.

6. The structure of claim 1, wherein the foot cleaner surface includes both the ramp portion and a substantially horizontal portion.

7. The structure of claim 6, wherein the ramp portion is made of a material having gaps at least as large as the average diameter of litter.

8. The structure of claim 1, wherein the ramp portion is made of a material having gaps at least as large as the average diameter of litter.

9. The structure of claim 8, wherein the ramp portion has a grate-like construction.

10. A structure according to claim 1 further comprising a litter pan removably positioned in the litter region, the pan to hold litter.

11. A structure according to claim 10 wherein the base, walls, top and divider are made of a lightweight plastic corrugated material.

12. A structure according to claim 1 wherein the base, walls, top and divider are made of a lightweight plastic corrugated material.

13. A structure suitable for use by an animal having paws, said container comprising:

a housing including a base, outer walls, and a top and defining an interior and an exit located above said base;

said housing being convertible between an open position in which said walls are secured to and extend upwardly from said base and said top is releasably secured to an upper portion of said walls; and a collapsed position in which said walls are substantially parallel to said base and top;

a divider removably separating the interior into a litter region and an exit region, said exit region being located above and substantially beside said litter region and below the exit;

an interior wall removably extending substantially from said top to said divider and defining a doorway between the litter region and the exit region, such that odor release through the exit is reduced and the animal must pass through the doorway to exit the container;

an adjustable door extensible across the doorway and adjustable for animal size;

the base, outer walls, top, divider and interior wall being composed of substantially solid sheets of material such that odor release from the container is reduced;

a grate-type foot cleaner within the exit region extending from said litter region to the exit, said foot cleaner including a ramp portion encouraging the animal to extend and flex its paws to ascend the ramp; such that in operation, litter may be placed in the litter region for use by the animal, and the animal must pass through the doorway and walk along the foot cleaner to exit the container, causing litter to fall from the paws to the divider defining the exit region, thereby reducing the amount of litter remaining on the animal's paws upon exiting the container, and the container may be collapsed for storage or shipping and reassembled for use.

* * * * *